(12) United States Patent
Otsuki et al.

(10) Patent No.: US 8,708,566 B2
(45) Date of Patent: Apr. 29, 2014

(54) HALF BEARING

(75) Inventors: Yuto Otsuki, Inuyama (JP); Mikio Suzuki, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 93 days.

(21) Appl. No.: 13/159,735

(22) Filed: Jun. 14, 2011

(65) Prior Publication Data

US 2011/0305410 A1 Dec. 15, 2011

(30) Foreign Application Priority Data

Jun. 14, 2010 (JP) ................................ 2010-135572

(51) Int. Cl.
*F16C 33/10* (2006.01)

(52) U.S. Cl.
USPC ........................................... 384/288; 384/294

(58) Field of Classification Search
USPC .................. 384/286, 288, 291, 294, 429, 430
See application file for complete search history.

(56) References Cited

U.S. PATENT DOCUMENTS

| | | | |
|---|---|---|---|
| 2,901,297 A * | 8/1959 | Sternlicht | 384/291 |
| 3,680,932 A * | 8/1972 | Raimondi | 384/291 |
| 4,105,267 A * | 8/1978 | Mori | 384/291 |
| 5,009,522 A * | 4/1991 | Hahn | 384/288 |
| 5,456,535 A * | 10/1995 | Chen et al. | 384/398 |
| 6,082,904 A * | 7/2000 | Ono et al. | 384/291 |
| 6,676,296 B2 * | 1/2004 | Inoue et al. | 384/276 |
| 7,234,870 B2 * | 6/2007 | Kitahara et al. | 384/288 |
| 7,399,122 B2 * | 7/2008 | Fujita et al. | 384/276 |
| 2005/0047689 A1 * | 3/2005 | Yamazaki et al. | 384/288 |
| 2012/0148179 A1 * | 6/2012 | Kondo et al. | 384/286 |
| 2012/0177309 A1 * | 7/2012 | Flores | 384/286 |

FOREIGN PATENT DOCUMENTS

| | | | |
|---|---|---|---|
| JP | 05202936 A * | 8/1993 | F16C 33/10 |
| JP | 8-277831 A | 10/1996 | |
| JP | 2005-69283 A | 3/2005 | |

OTHER PUBLICATIONS

Translation of JP 05202936 obtained on Nov. 2, 2012.*

* cited by examiner

*Primary Examiner* — Marcus Charles
*Assistant Examiner* — Adam D Rogers
(74) *Attorney, Agent, or Firm* — Browdy and Neimark, PLLC (57) ABSTRACT

A half bearing for a crankshaft of an internal combustion engine, which includes crush relieves at both circumferential end portions of an inner circumferential surface of the half bearing, is provided. The half bearing further includes an axial groove at least at a position adjacent to a crush relief on a rear side of a relative rotation direction of the crankshaft, and adjacent to the inner circumferential surface of the half bearing. The axial groove extends along an entire width of the inner circumferential surface of the half bearing.

4 Claims, 7 Drawing Sheets

HALF BEARING

TECHNICAL FIELD

The present invention relates to a half bearing for a crankshaft of an internal combustion engine, where crush relieves are formed at both circumferential end portions of an inner circumferential surface of the half bearing.

BACKGROUND OF THE INVENTION

A cylindrical sliding bearing is composed of assembled two half bearings and has been conventionally used as a sliding bearing for a journal or a crankpin portion of a crankshaft of an internal combustion engine. In order to feed lubricant oil to the sliding bearing, the oil is first fed from outside of the sliding bearing for a journal portion into an oil groove on an inner circumferential surface of the sliding bearing, and then fed to a sliding surface of the sliding bearing for a journal portion. The oil is then passes through an inner oil path of the crankshaft and fed to a sliding surface of a sliding bearing for a crankpin portion (for example, see JP-A-08-277831).

In the conventional sliding bearing for a journal portion or a crankpin portion of a crankshaft, a crush relief is formed on an inner circumferential surface of a half bearing. Although displacement or deformation may generate when end surfaces of a pair of half bearings are butt to assemble the half bearings into a bearing housing, the displacement or deformation are absorbed due to the crush relief. In the specification, the term "crush relief" means a region close to a circumferential end surface of a half bearing and having reduced wall thickness gradually reducing toward the circumferential end surface. The center of curvature of a bearing inner circumferential surface in the region with reduced wall thickness is different from that of a bearing inner circumferential surface in another region, as defined in SAE J506 (see items 3.26 and 6.4), DIN1497 (see section 3.2), and JIS D3102 (see item 2.4).

There has been also proposed a sliding bearing where not only the crush relief but also a chamfer is formed at a circumferential end portion of an inner circumferential surface of a half bearing such that a foreign substance is discharged through a gap between the crush relief and a crankshaft surface as well as between the chamfer and the crankshaft surface to prevent the foreign substance in oil to be fed to the sliding bearing from being supplied onto a sliding surface of the sliding bearing (for example, see JP-A-2005-69283).

SUMMARY OF THE INVENTION

In recent years, oil pumps for internal combustion engines have been made small, so that the amount of oil fed to a sliding bearing has been decreasing. Accordingly, a bearing gap between a crankshaft surface and an inner circumferential surface (a sliding surface) of the sliding bearing tends to be smaller in order to reduce a leakage of oil to outside from the bearing gap. If a foreign substance is mixed in oil on the inner circumferential surface of the sliding bearing and is smaller than the bearing gap, the foreign substance flows out with the oil even when it comes into the bearing gap. Thus, the foreign substance is hardly embedded into the inner circumferential surface of the sliding bearing, causing little influence on the bearing performance.

On the other hand, if the foreign substance mixed on the inner circumferential surface of the sliding bearing is larger than the bearing gap, the foreign substance is discharged from an oil feed path to a crush relief portion having a larger gap than the bearing gap if the crush relief is formed on the inner circumferential surface of the half bearing. Some foreign substances are discharged in the crush relief portion, that is, a relief gap between a crush relief surface and the crankshaft surface and then are discharged with the oil leaking out of the relief gap from both width end portions of the half bearing. However, remaining foreign substances flow toward the inner circumferential surface of the half bearing with the oil flowing along the surface of a rotating crankshaft in a rotation direction of the crankshaft.

In the crush relief formed at a circumferential end portion of the half bearing on a rear side of the relative rotation direction of the crankshaft, however, the relief gap becomes smaller toward the front side of the relative rotation direction of the crankshaft. Thus, the foreign substances flowing toward the inner circumferential surface of the half bearing are brought into contact with the crankshaft surface at a portion where the relief gap is smaller, and thereby pushed in the crush relief surface or the inner circumferential surface of the half bearing adjacent to the crush relief. Particularly, the bearing gap tends to be designed to be smaller in recent years. Thus, a portion where a large amount of foreign substances are embedded is easily formed on the crush relief surface at the circumferential end portion of the inner circumferential surface of the half bearing on the rear side of the relative rotation direction of the crankshaft or at the inner circumferential surface of the half bearing adjacent to the crush relief. When the portion where a large amount of foreign substances are embedded is locally formed as described above, a seizure may occur on the inner circumferential surface of the half bearing due to heat generated when the foreign substances and the crankshaft surface are brought into contact.

In a case where not only the crush relief but also an axial groove (a chamfer) is formed at the circumferential end portion of the inner circumferential surface of the half bearing as disclosed in JP-A-2005-69283, most of the foreign substances are discharged into the crush relief portion but pass over the axial groove along with the oil flowing along the surface of the rotating crankshaft in the rotation direction of the crankshaft. Thus, the foreign substances discharged into the relief gap easily flow into the portion where the relief gap is smaller on the rear side of the relative rotation direction of the crankshaft. As in the case in which only the crush relief is formed at the circumferential end portion of the inner circumferential surface of the half bearing, the foreign substances are pushed in the crush relief surface by the crankshaft surface, so that the portion where foreign substances are embedded is easily formed locally on the half bearing.

The present invention has been made in view of the aforementioned circumstances, and it is an object of the present invention to provide a half bearing for a crankshaft of an internal combustion engine having improved ability of discharging a foreign substance.

To achieve the above object, the present invention provides a half bearing for a crankshaft of an internal combustion engine, including crush relieves at both circumferential end portions on an inner circumferential surface of the half bearing, wherein the half bearing further includes an axial groove at least at a position adjacent to a crush relief on a rear side of a relative rotation direction of the crankshaft, and also adjacent to the inner circumferential surface of the half bearing, and wherein the axial groove extends along an entire width of the inner circumferential surface of the half bearing. In the present invention, an axial groove is formed at least at a position adjacent to the crush relief formed at the circumferential end portion of the inner circumferential surface of the half bearing on the rear side of the relative rotation direction of the crankshaft, and also adjacent to the inner circumferential surface of the half bearing, and the axial groove extends along the entire width of the inner circumferential surface of the half bearing. Thus, a foreign substance discharged into a relief gap (that is a gap between the crush relief surface and the crankshaft surface) from an oil feed path flows toward the axial groove along with oil flowing along the surface of the rotating crankshaft. When the oil flowing in the rotation direction of the crankshaft in the relief gap reaches the axial groove, the flow is divided into a bearing gap (that is a gap between the crankshaft surface and the inner circumferential surface of a sliding bearing) and the axial groove. If the foreign substance discharged into the relief gap is larger than the bearing gap, the foreign substance enters the axial groove. Since the axial groove is formed at a portion where the relief gap is smallest and adjacent to the inner circumferential surface of the half bearing, the foreign substance discharged into the relief gap is hardly embedded into the crush relief surface. The foreign substance can be thereby effectively discharged outside from a width end portion of the half bearing along with the oil flowing through the axial groove.

In an embodiment of the invention, the axial groove preferably has a depth of 0.1 mm to 0.5 mm. Since the foreign substance mixed into the oil has a maximum size of about 0.1 mm, the depth of the axial groove needs to be 0.1 mm or more such that the foreign substance can enter the axial groove. However, when the axial groove is too deep, the leakage of oil from the axial groove increases. Thus, the depth of the axial groove is preferably 0.5 mm or less.

In an embodiment of the invention, the axial groove preferably has a width of 0.1 mm to 2 mm. Since the foreign substance mixed into the oil has a maximum size of about 0.1 mm, the width of the axial groove needs to be 0.1 mm or more such that the foreign substance can enter the axial groove. However, when the axial groove is too wide, the leakage of oil from the axial groove increases too much. Thus, the width of the axial groove is preferably 2 mm or less.

In an embodiment of the invention, the half bearing preferably includes axial grooves at positions adjacent to the crush relieves on both front and rear sides of the relative rotation direction of the crankshaft, and also adjacent to the inner circumferential surface of the half bearing. With the feature, when the half bearing is assembled into a bearing housing, the case can be prevented where the half bearing is assembled with the axial groove located only on the front side of the relative rotation direction of the crankshaft.

DETAILED DESCRIPTION OF THE INVENTION

Figure 1:
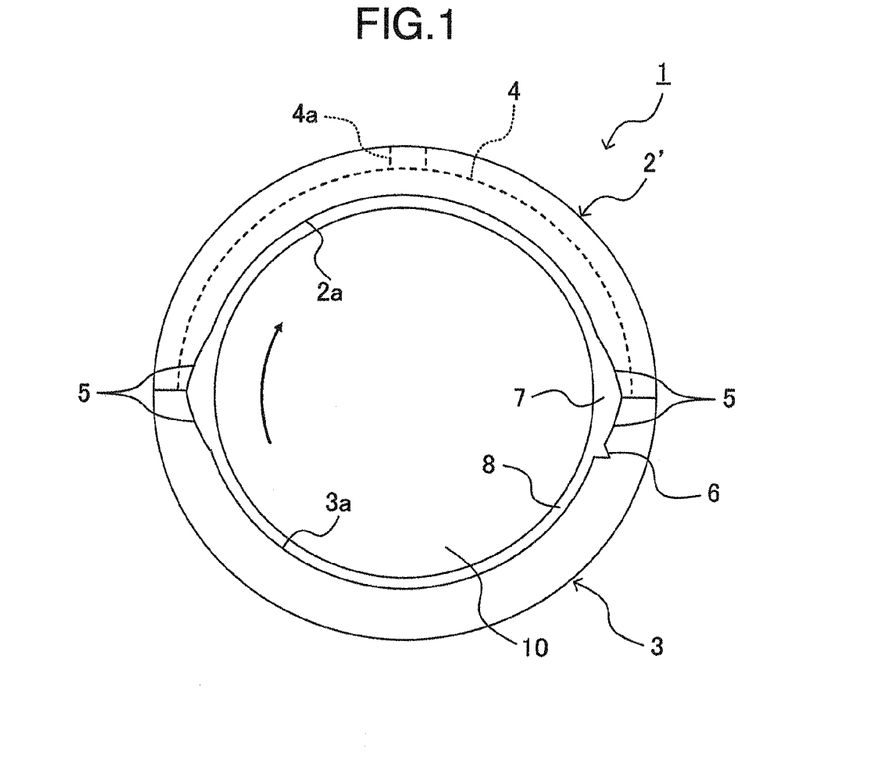
FIG. 1 is a side view of a sliding bearing including a pair of half bearings that support a journal portion of a crankshaft.
Figure 2:
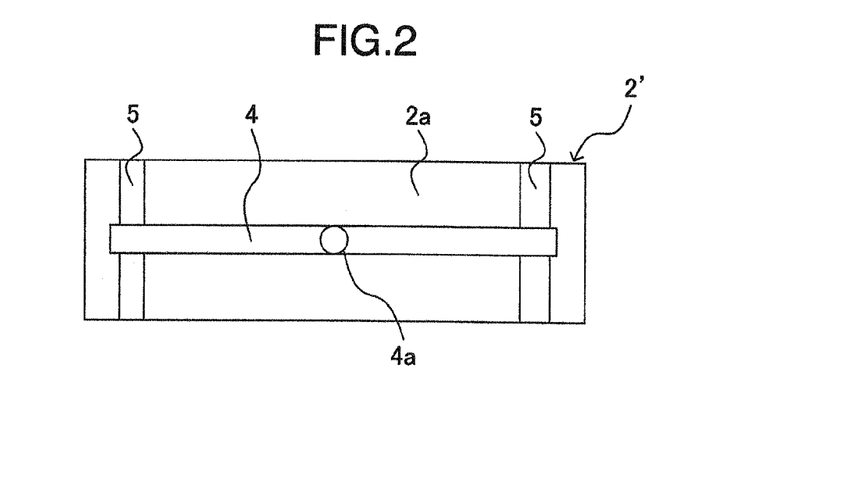
FIG. 2 is a plan view of the upper half bearing of the sliding bearing of FIG. 1.
Figure 3:
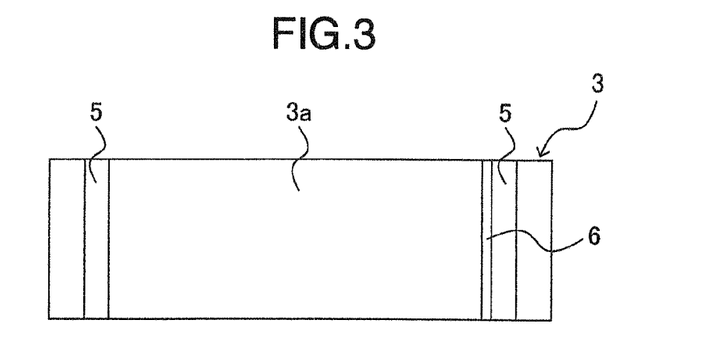
FIG. 3 is a plan view of the lower half bearing of the sliding bearing of FIG. 1.
Figure 4:
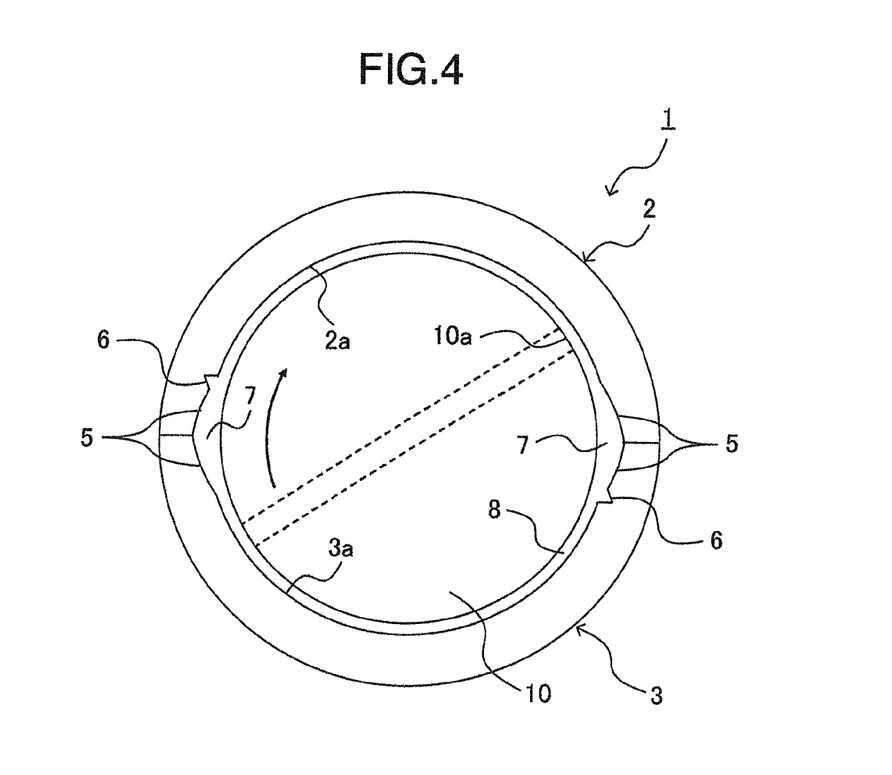
FIG. 4 is a side view of a sliding bearing including a pair of half bearings that support a crankpin portion of a crankshaft.
Figure 5:
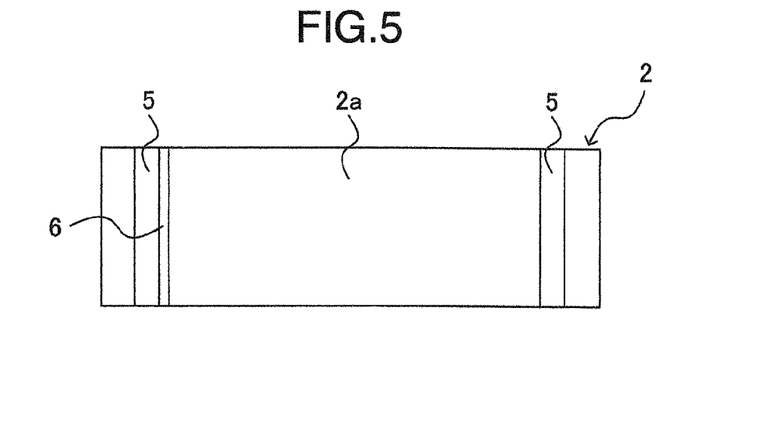
FIG. 5 is a plan view of the upper half bearing of the sliding bearing of FIG. 4.
Figure 6:
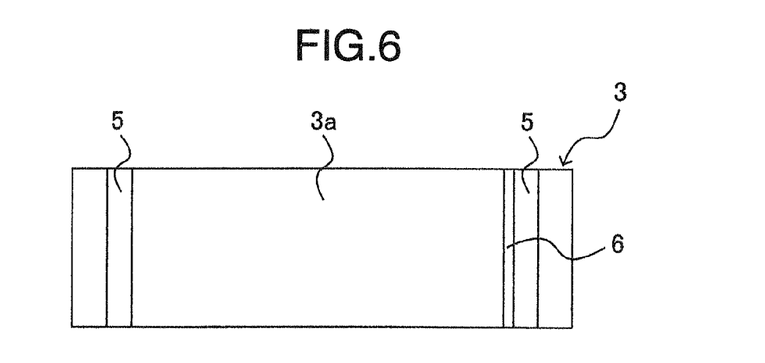
FIG. 6 is a plan view of the lower half bearing of the sliding bearing of FIG. 4.
Figure 8A:
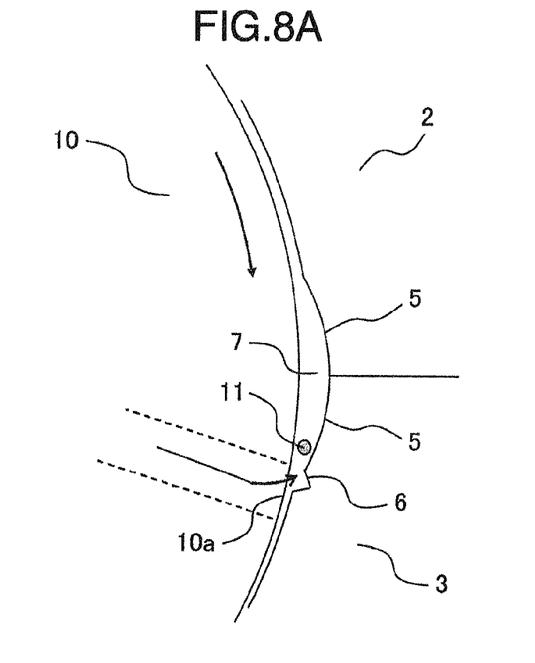
FIG. 8A is a side view of the sliding bearing for explaining a mechanism to discharge a foreign substance in the sliding bearing for a crankpin portion.
Figure 8B:
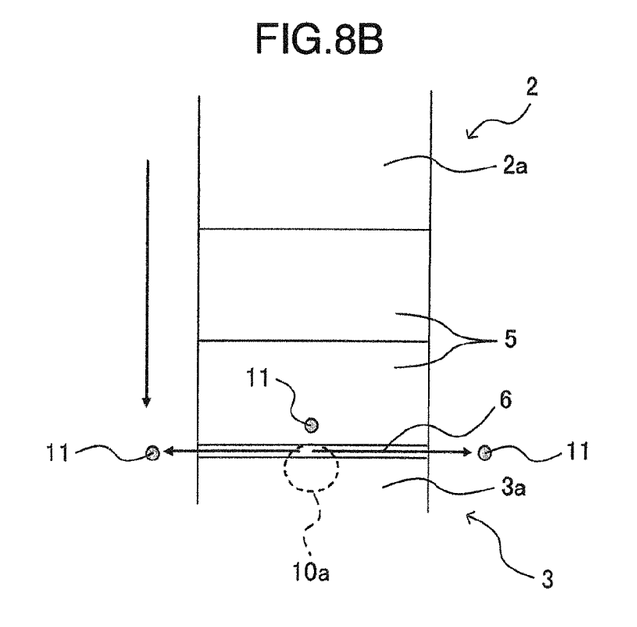
FIG. 8B is a plan view of the sliding bearing for explaining a mechanism to discharge a foreign substance in the sliding bearing for a crankpin portion.
Figure 9:
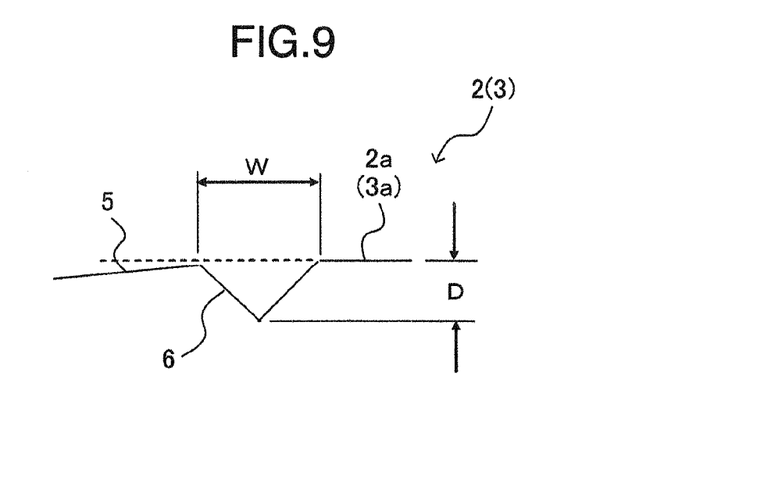
FIG. 9 is a cross-sectional view of an axial groove.
Figure 10:
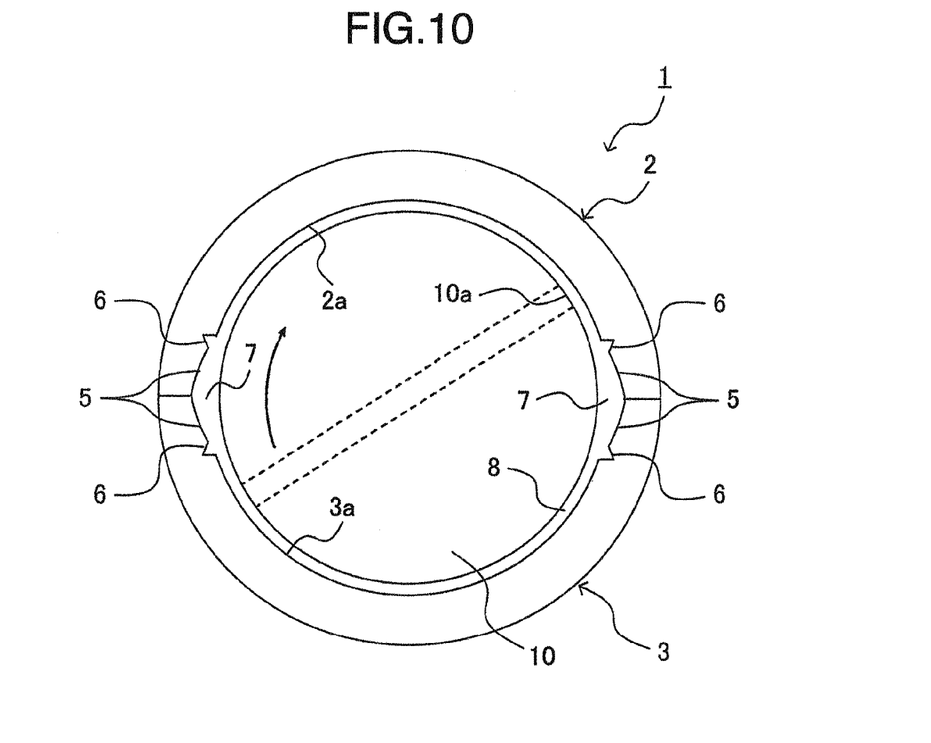
FIG. 10 is a side view of the sliding bearing where two axial grooves are formed in each of the pair of half bearings that support a crankpin portion of a crankshaft.
Figure 11:
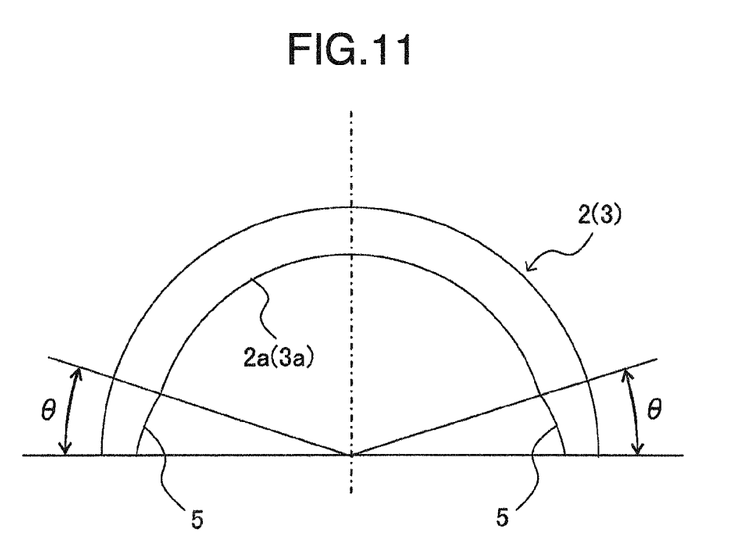
FIG. 11 is a side view of the half bearing for explaining a range in which the axial groove is formed in the half bearing.

Embodiments of the present invention will be described with reference to FIGS. 1 to 11. FIG. 1 is a side view of a sliding bearing 1 including a pair of half bearings 2' and 3 that support a journal portion of a crankshaft 10. FIG. 2 is a plan view of the upper half bearing 2' of the sliding bearing 1 of FIG. 1. FIG. 3 is a plan view of the lower half bearing 3 of the sliding bearing 1 of FIG. 1. FIG. 4 is a side view of a sliding bearing 1 including a pair of half bearings 2 and 3 that support a crankpin portion of a crankshaft 10. FIG. 5 is a plan view of the upper half bearing 2 of the sliding bearing 1 of FIG. 4. FIG. 6 is a plan view of the lower half bearing 3 of the sliding bearing 1 of FIG. 4. FIGS. 7A and 7B, and 8A and 8B are respectively a side view and a plan view of the sliding bearing 1 for explaining a mechanism to discharge a foreign substance 11 in the sliding bearing 1 for a crankpin portion. FIG. 9 is a cross-sectional view of an axial groove 6. FIG. 10 is a side view of the sliding bearing 1 where two axial grooves 6 are formed in each of the pair of half bearings 2 and 3 that support the crankpin portion of the crankshaft 10. FIG. 11 is a side view of the half bearing 2 or 3 for explaining a range in which the axial groove 6 is formed in the half bearing 2 or 3. It should be noted that the above drawings schematically illustrate the sliding bearing 1 according to the embodiments, and each portion may be exaggerated or omitted to the understanding of its configuration, structure or the like.

First, a first embodiment in which the half bearing 3 according to the present invention is applied to the journal portion of the crankshaft 10 will be described by reference to FIGS. 1 to 3. As shown in FIG. 1, the sliding bearing 1 that rotatably supports the crankshaft 10 of an internal combustion engine is formed in a cylindrical shape by combining the pair of upper and lower half bearings 2' and 3 each having a halved shape. To obtain bearing properties, such as seizure resistance, of the half bearings 2' and 3, inner circumferential surfaces 2a and 3a of the half bearings 2' and 3 are lined with a sliding material such as a copper alloy, an aluminum alloy, and a tin or lead alloy on a steel back-metal, and also overlaid with tin or lead alloy, synthetic resin or the like, if necessary.

As shown in FIG. 2, an oil groove 4 for feeding lubricant oil between the half bearings 2', 3 and the crankshaft 10 supported by the half bearings 2' and 3 is formed on the inner circumferential surface 2a of the upper half bearing 2' along the entire circumference and at substantially the center of the width. The oil groove 4 is formed with a constant depth, or a gradually decreasing or increasing depth in a predetermined range of the circumference. A feed hole 4a for receiving the oil from outside is formed in the oil groove 4 radially through the upper half bearing 2'.

As shown in FIGS. 2 and 3, a crush relief 5 is cut away to form a concave shape at both circumferential end portions of each of the inner circumferential surfaces 2a and 3a of the half bearings 2' and 3 along the entire width. When the two half bearings 2' and 3 are assembled to form a cylindrical shape as shown in FIG. 1, the crush reliefs 5 form a relief gap 7 between the crush reliefs 5 and a surface of the crankshaft 10, thereby absorbing displacement or deformation at butt ends of the half bearings 2' and 3 and prevent local abutting against the crankshaft 10. The crush relief 5 at a circumferential end portion of each of the half bearings 2' and 3 on the rear side of the relative rotation direction of the crankshaft 10 is constituted such that the relief gap 7 becomes smaller toward the front side of the relative rotation direction of the crankshaft 10. The crush relief 5 at a circumferential end portion of each of the half bearings 2' and 3 on the front side of the relative rotation direction of the crankshaft 10 is constituted such that the relief gap 7 becomes smaller toward the rear side of the relative rotation direction of the crankshaft 10.

According to the first embodiment, an axial groove 6 is cut away in a V shape in the lower half bearing 3 along the entire width so as to extend adjacent to the crush relief 5 at the circumferential end portion on the rear side of the relative rotation direction of the crankshaft 10 and adjacent to the inner circumferential surface 3a of the lower half bearing 3 as shown in FIGS. 1 and 3.

In the lower half bearing 3 having the above configuration, the foreign substance 11 is discharged into the relief gap 7 from the oil groove 4 of the upper half bearing 2' (see FIGS. 7A, 7B, 8A and 8B) and flows toward the axial groove 6 along with the oil flowing along the surface of the rotating crankshaft 10. When the oil flowing in the rotation direction of the crankshaft 10 in the relief gap 7 reaches the axial groove 6, the flow is divided into a bearing gap 8 between the surface of the crankshaft 10 and the inner circumferential surfaces 2a, 3a of the half bearings 2' and 3, and the axial groove 6. If the foreign substance 11 discharged into the relief gap 7 is larger than the bearing gap 8, the foreign substance 11 enters the axial groove 6. Since the axial groove 6 is formed in a portion where the relief gap 7 is smallest and adjacent to the inner circumferential surface 3a of the lower half bearing 3, the foreign substance 11 discharged into the relief gap 7 is hardly embedded in the crush relief 5, and can be effectively discharged outside from the width end portion of the lower half bearing 3 along with the oil flowing through the axial groove 6.

Next, a second embodiment in which the half bearings 2 and 3 according to the present invention are applied to the crankpin portion of the crankshaft 10 will be described with reference to FIGS. 4 to 8. The same reference numerals are assigned to members having the same functions as those in the first embodiment. An oil hole 10a opens on the surface of the crankshaft 10 to feed lubricant oil between the half bearings 2 and 3 and the crankshaft 10 supported by the half bearings 2 and 3 through an inner oil path of the crankshaft 10 as shown in FIG. 4.

According to the second embodiment, an axial groove 6 is cut away to form a V shape in each of the half bearings 2 and 3 along the entire width so as to be adjacent to the crush relief 5 at the circumferential end portion of each of the inner circumferential surfaces 2a and 3a of the half bearings 2 and 3 on the rear side of the relative rotation direction of the crankshaft 10, as shown in FIGS. 4 to 6. As described above, the axial groove 6 is formed not only on the inner circumferential surface 3a of the lower half bearing 3 but also on the inner circumferential surface 2a of the upper half bearing 2 in the second embodiment. Although both of the pair of half bearings 2 and 3 include the axial groove 6 in the second embodiment, only one of the pair of half bearings 2 and 3 may include the axial groove 6.

Figure 7A:
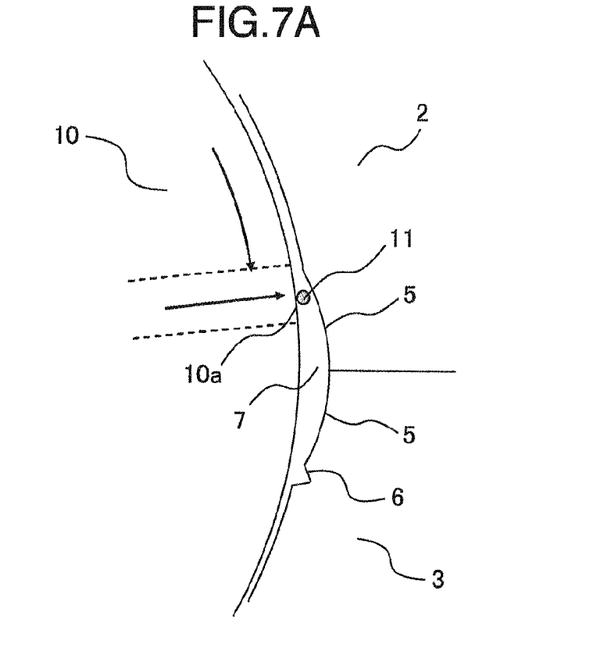
FIG. 7A is a side view of the sliding bearing for explaining a mechanism to discharge a foreign substance in the sliding bearing for a crankpin portion.
Figure 7B:
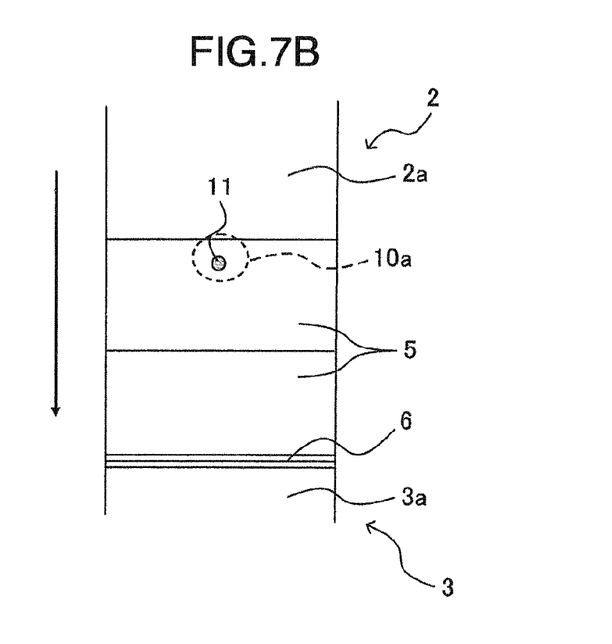
FIG. 7B is a plan view of the sliding bearing for explaining a mechanism to discharge a foreign substance in the sliding bearing for a crankpin portion.

In the half bearings 2 and 3 having the above configuration, the oil and the foreign substance 11 in the inner oil path of the crankshaft 10 are discharged into the relief gap 7 from the oil hole 10a opening on the surface of the crankshaft 10 as shown in FIGS. 7A and 7B. The foreign substance 11 discharged into the relief gap 7 flows toward the axial groove 6 along with the oil flowing along the surface of the rotating crankshaft 10 in the rotation direction of the crankshaft 10. The foreign substance 11 reaches the axial groove 6 slightly after it reaches the oil hole 10a. When the oil hole 10a opening on the surface of the crankshaft 10 passes through the axial groove 6, a large portion of the oil hole 10a is blocked by the inner circumferential surface 3a of the lower half bearing 3 as shown in FIGS. 8A and 8B. Thus, the flow rate of the oil flowing through the axial groove 6 instantaneously becomes very fast. The foreign substance 11 reaching the axial groove 6 slightly after it reaches the oil hole 10a can be thereby quickly discharged outside from the width end portion of the lower half bearing 3 due to the fast oil flow in the axial groove 6. As described above, the oil flow rate in the axial groove 6 instantaneously becomes fast in the second embodiment in which the half bearings 2 and 3 according to the present invention are applied to the crankpin portion of the crankshaft 10. Thus, the foreign substance 11 reaching the axial groove 6 can be more effectively discharged as compared to that in the first embodiment in which the half bearing 3 according to the present invention is applied to the journal portion of the crankshaft 10.

If the axial groove 6 is not formed on the border between the crush relief 5 and each of the inner circumferential surfaces 2a and 3a of the half bearings 2 and 3 unlike in the half bearings 2 and 3 of the present invention, the oil from the oil hole 10a flows spread over the entire relief gap 7 when the oil hole 10a passes through the crush relief 5. Thus, the oil can not flow fast enough to bear away the foreign substance 11 toward the width end portions of the half bearings 2 and 3. If, for example, a plurality of axial grooves 6 are formed close to the border between the crush relief 5 and each of the inner circumferential surfaces 2a and 3a of the half bearings 2 and 3 unlike in the half bearings 2 and 3 of the present invention, the leakage of oil to outside the half bearings 2 and 3 from the plurality of axial grooves 6 increases too much. When the oil hole 10a opening in the surface of the crankshaft 10 passes through the plurality of axial grooves 6, the oil from the oil hole 10a flows spread over the plurality of axial grooves 6. Thus, the oil can not flow instantaneously fast in the plurality of axial grooves 6, so that ability for discharging a foreign-substance from the plurality of axial grooves 6 is decreased.

As shown in FIG. 9, the cross-sectional shape of the axial groove 6 is a V shape. A depth D and a width W thereof may be 0.1 mm or more respectively such that the foreign substance 11 can enter the axial groove 6 since the foreign substance 11 mixed in the oil has a maximum size of about 0.1 mm. When the depth D of the axial groove 6 is too deep or the width W of the axial groove 6 is too wide, the leakage of oil from the axial groove 6 increases too much. Thus, the depth D of the axial groove 6 is preferably 0.5 mm or less, and the width W of the axial groove 6 is preferably 2 mm or less. The depth D of the axial groove 6 is calculated based on a distance from the virtual inner circumferential surfaces (a dotted line in FIG. 9) of the half bearings 2 and 3 assuming that the crush relief 5 and the axial groove 6 are not formed on the inner circumferential surfaces 2a and 3a of the half bearings 2 and 3. The cross-sectional shape of the axial groove 6 is not limited to the V shape in the present embodiment, and may be any shape such as an inverted trapezoidal shape or a U shape.

According to the embodiment, the axial groove 6 is formed only at a position adjacent to the crush relief 5 at the circumferential end portion of each of the inner circumferential surfaces 2a and 3a of the half bearings 2 and 3 on the rear side of the relative rotation direction of the crankshaft 10 and each of the inner circumferential surfaces 2a and 3a of the half bearings 2 and 3. However, the axial groove 6 may be also formed in a similar shape at a position adjacent to the crush relief 5 formed at the circumferential end portions of each of the inner circumferential surfaces 2a and 3a of the half bearings 2 and 3 not only on the rear side but also on the front side of the relative rotation direction of the crankshaft 10, as shown in FIG. 10. Accordingly, when the half bearings 2 and 3 are assembled into a bearing housing, a case can be prevented where the half bearings 2 and 3 are assembled with the axial grooves 6 located only on the front side of the relative rotation direction of the crankshaft 10 on the inner circumferential surfaces 2a and 3a of the half bearings 2 and 3.

According to the present embodiment, the axial groove 6 is most preferably formed such that the width center of the axial groove 6 corresponds to the border between the crush relief 5 and each of the inner circumferential surfaces 2a and 3a of the half bearings 2 and 3. However, when the axial groove 6 is produced, an inevitable dimension error occurs due to the machining accuracy of a machine tool. Thus, the inevitable dimension error is tolerated in the present invention. To be more specific, displacement of a line connecting the width center of the axial groove 6 and the center of the half bearings 2 and 3 is tolerated in a range of −2° to +2° from an angle θ which is defined by a line connecting the border between the virtual crush relief 5 obtained when the axial groove 6 is not formed in the half bearings 2 and 3 and the inner circumferential surfaces 2a and 3a of the half bearings 2 and 3 and the center of the half bearings 2 and 3, and a line connecting the circumferential end surface of the half bearings 2 and 3 and the center of the half bearings 2 and 3, as shown in FIG. 11.

The invention claimed is:

1. A half bearing for a crankpin portion of a crankshaft of an internal combustion engine, comprising a first crush relief and a second crush relief at both circumferential end portions of an inner circumferential surface of the half bearing, the first crush relief being positioned on a rear side of a relative rotation direction of the crankshaft, and the second crush relief being positioned on a front side of the relative rotation direction of the crankshaft,
    wherein the half bearing further comprises a first axial groove at a position adjacent to the first crush relief, the first axial groove being positioned such that one end of the first axial groove is in the inner circumferential surface of the half bearing and another end is in the first crush relief, and
    wherein the first axial groove extends along an entire width of the inner circumferential surface of the half bearing.

2. The half bearing according to claim 1, wherein the first axial groove has a depth of 0.1 mm to 0.5 mm.

3. The half bearing according to claim 1, wherein the first axial groove has a width of 0.1 mm to 2 mm.

4. The half bearing according to claim 1, wherein the half bearing further comprises a second axial groove at a position adjacent to the second crush relief, and adjacent to the inner circumferential surface of the half bearing.

* * * * *